(12) United States Patent
Gao et al.

(10) Patent No.: US 8,929,923 B2
(45) Date of Patent: Jan. 6, 2015

(54) METHOD AND DEVICE FOR LOCATING TERMINAL BY USING BASE STATION

(75) Inventors: Yin Gao, Shenzhen (CN); Hao Wu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 312 days.

(21) Appl. No.: 13/257,125

(22) PCT Filed: May 26, 2010

(86) PCT No.: PCT/CN2010/073273
§ 371 (c)(1),
(2), (4) Date: Sep. 16, 2011

(87) PCT Pub. No.: WO2011/015074
PCT Pub. Date: Feb. 10, 2011

(65) Prior Publication Data
US 2012/0122473 A1     May 17, 2012

(30) Foreign Application Priority Data
Aug. 7, 2009   (CN) .......................... 2009 1 0164069

(51) Int. Cl.
*H04M 3/00* (2006.01)
*H04W 24/00* (2009.01)
(Continued)

(52) U.S. Cl.
CPC .................. *H04W 64/00* (2013.01); *G01S 5/00* (2013.01); *G01S 5/0205* (2013.01); *G01S 5/14* (2013.01); *Y02B 60/50* (2013.01)
USPC ..... 455/456.5; 455/418; 455/419; 455/456.1; 455/466

(58) Field of Classification Search
CPC ....... H04W 24/00; H04W 48/04; H04W 8/02; H04W 8/04; H04W 48/06; H04W 4/12; H04W 64/00; H04W 4/02; G01S 5/00; G01S 5/0205; G01S 5/14; G01S 5/0063; G01S 5/36; G01S 5/27
USPC .......... 455/67.11, 418–420, 422.1, 423–425, 455/456.1–456.6, 466, 517, 522, 524–526, 455/550.1, 551, 552.1, 560–561, 404.2, 455/433–434, 556.2; 370/310, 328, 338; 701/491, 495, 506, 517
See application file for complete search history.

(56) References Cited

U.S. PATENT DOCUMENTS 6,584,314 B1 * 6/2003 Haumont et al. .......... 455/435.1
6,898,433 B1 * 5/2005 Rajaniemi et al. ......... 455/456.1
(Continued)

FOREIGN PATENT DOCUMENTS

| CN | 1322102 A | 11/2001 |
|----|-----------|---------|
| CN | 1764310 A | 4/2006 |

(Continued)

OTHER PUBLICATIONS

"Universal Mobile Telecommunications System (UMTS); Stage 2 Functional Specification of Location Services in UTRAN (3GPP TS 25.305 version 3.3.0 Release 1999); ETSI TS 125 305", IEEE, LIS, Sophia Antipolis Cedex, France, vol. 3-R2, No. V3.3.0, Sep. 1, 2000, XP014008650, ISSN: 0000-0001; 44 pages.

(Continued)

*Primary Examiner* — Meless Zewdu
(74) *Attorney, Agent, or Firm* — McGarry Bair PC

(57) ABSTRACT

The present invention provides a method for locating a terminal by using a base station, and the method includes steps as follows: constructing a locating message by expanding a location report message or via an independent message; sending the locating message to a locating judgment center; and locating the terminal by using the locating message. The present invention is helpful to reduce the power consumption of the User Equipment (UE).

5 Claims, 6 Drawing Sheets

(51) Int. Cl.
*H04W 4/00* (2009.01)
*H04W 64/00* (2009.01)
*G01S 5/00* (2006.01)
*G01S 5/02* (2010.01)
*G01S 5/14* (2006.01)

(56) References Cited

U.S. PATENT DOCUMENTS

| | | | |
|---|---|---|---|
| 7,957,739 B2* | 6/2011 | Jeong et al. | 455/436 |
| 7,996,017 B2* | 8/2011 | Vanttinen | 455/456.2 |
| 8,131,459 B2* | 3/2012 | De Luca et al. | 701/408 |
| 8,625,523 B2* | 1/2014 | Wang et al. | 370/329 |
| 8,654,010 B2* | 2/2014 | Wigren | 342/387 |
| 2002/0160787 A1 | 10/2002 | Chen et al. | |
| 2005/0070311 A1* | 3/2005 | Choukroun et al. | 455/456.5 |
| 2006/0172773 A1* | 8/2006 | Morishita et al. | 455/560 |
| 2008/0043672 A1* | 2/2008 | Sebire et al. | 370/331 |
| 2009/0047951 A1* | 2/2009 | Yeoum et al. | 455/435.1 |
| 2009/0131073 A1 | 5/2009 | Carlson et al. | |
| 2009/0209259 A1* | 8/2009 | Brusilovsky et al. | 455/438 |
| 2009/0270111 A1* | 10/2009 | Nakamura et al. | 455/456.1 |
| 2010/0289640 A1* | 11/2010 | Annamalai | 340/539.13 |

FOREIGN PATENT DOCUMENTS

| | | |
|---|---|---|
| CN | 1770909 A | 5/2006 |
| CN | 1984472 A | 6/2007 |
| EP | 1 862 814 A1 | 12/2007 |
| JP | 2009524979 A | 7/2009 |
| WO | 2007/133045 A1 | 11/2007 |

OTHER PUBLICATIONS

Supplementary European Search Report; European Patent Office; Munich, Germany; Oct. 7, 2013; 9 pages.

* cited by examiner

| information element | Implication |
|---|---|
| Terminal related information | Such as IMSI of terminal, and/or unique connection mark of base station and terminal at S1 interface, and/or unique connection mark of mobility management entity and UE at S1 interface |
| Serving cell information | Global identifier of current serving cell, can also include RTT from the terminal to the serving cell, or the distance from the terminal to the serving cell calculated by the base station |
| Neighbor cell information | Including the global identifier of the neighbor cell and the latest RSRP and/or RSRQ of the neighbor cell detected by the terminal |
| Location information of the current base station | Including the longitude and latitude information of the base station |

Fig.5

METHOD AND DEVICE FOR LOCATING TERMINAL BY USING BASE STATION

CROSS-REFERENCE TO RELATED APPLICATIONS

This application is a National Phase application of International Application No. PCT/CN2010/073273 filed on May 26, 2010, which claims the benefit of Chinese Patent Application No. 200910164069.7, filed Aug. 7, 2009, both of which are incorporated herein by reference in their entirety.

FIELD OF THE INVENTION

The present invention relates to a wireless cellular communication system, especially to a method for locating a terminal by using a base station in a Long Term Evolution (LTE) and a Long Term Evolution-Advanced (LTE-A) mobile communication system.

BACKGROUND OF THE INVENTION

The LTE network consists of evolved NodeBs (eNBs) of an evolved UTRAN (E-UTRAN) and an evolved packet core (EPC), and is a flat network. In the above, the E-UTRAN includes a set of eNBs which are connected to the EPC via S1 interfaces and can connect to each other via X2 interfaces, wherein the S1 and X2 are logical interfaces. One EPC can manage one or more eNBs, one eNB can be controlled by multiple EPCs; and one eNB can manage one or more cells. The LTE-A system is evolved from the LTE system and the network architecture of which is consistent with that of the LTE. Meanwhile, an operation, administration and management (OAM) system, which can perform operations and management to one or more network elements in the network architecture, exists in the network architecture.

On one hand, much works need to be done to establish and operate a network, such as planning, configuration, optimization, computation, adjustment, testing, prevention of errors, failures reduction and self-recovery, thus what the operators mainly concern is how to lower operation and maintenance costs. On the other hand, subscribers require simplifying the process of using, for example, when buying a Home NodeB apparatus, the subscriber wishes a plug-and-play apparatus that can automatically obtain configuration for operation once electrified. The trend of the next generation mobile network is certainly self-configuration, self-optimization, and self-adapting with fewer and fewer human factors impacting on the network. Therefore a concept of self-organizing network came into being, which includes self-configuration and self-optimization. The self-optimization includes coverage and mobility optimizations, wherein the coverage optimization relates to the detections for coverage holes and coverage insufficiencies. The mobility optimization needs to search and analyze on information of various switching events in current cell, wherein the location information of the terminal at the time of events happening plays an important part in analysis of above optimization scenes.

Traditional locating methods include the followings: CELL-ID, CELL-ID+ Round Trip Time (RTT), and Observed Time Difference of Arrival (OTDOA), wherein the CELL-ID locating technique is a most basic locating method, in which the location of the subscriber is determined according to the ID number of the cell where a mobile station locates. The precision of the CELL-ID locating technique depends on cell radius, i.e., the size of the cell where the mobile station locates, ranging from a few hundreds of meters to several tens of kilometers. The locating precision for CELL-ID in the case of suburbs and countryside is relatively low due to the wide coverage of the cell. The cell coverage of urban area is smaller, the cell radius generally being 1-2 km. For a dense urban area where micro cell is applied, the cell radius can be a few hundreds of meters, and the locating precision of CELL-ID is correspondingly improved to a few hundreds of meters. Compared with other techniques, the locating precision of CELL-ID is the lowest. When an emergency locating service with relatively high precision is needed, the CELL-ID can not meet this demand. On the other hand, a locating measurement by the mobile station is unnecessary for the CELL-ID locating, and very little locating signaling needs to be transmitted through an air interface, thus the locating response time is relatively short, usually within 3 seconds.

The CELL-ID+ RTT is an improved technique based on the CELL-ID locating technique, and performs locating by employing the CELL-ID of the current serving cell of the terminal and current RTT information from the terminal to the base station.

The OTDOA is similar to enhanced Observed Time Difference (E-OTD) of a GSM network, in which downlink pilot signals of different base stations are measured through a mobile station, to obtain the Time Of Arrivals (TOAs) of the downlink pilot signals of the different base stations, the location of the mobile station is then figured out by using a proper location estimation algorithm according to the measurement results and the coordinates of the base station.

During network implementation, the terminal is user equipment which directly influences user experience, therefore, in terminal locating, how to make the best use of base station information for locating is helpful to reduce terminal power consumption and improve satisfaction degree of user experience. When the user terminal is at connection status, how to make the best use of the information which can be acquired by the base station to realize terminal locating is what the present invention needs to address.

SUMMARY OF THE INVENTION

The present invention is provided to overcome the problem of lowered user's satisfaction degree resulted from overhigh terminal power consumption during locating. Therefore, the present invention mainly aims at providing a solution for locating terminal to solve the above problem.

The present invention provides a method for locating a terminal by using a base station, comprising the steps of: constructing a locating message by expanding a location report message or via an independent message; sending the locating message to a locating judgment center; and locating the terminal by using the locating message.

In the above, the locating message comprises information about a round trip time (RTT) for transmitting and receiving from the terminal to a current serving base station, a global identifier of a current serving cell of the terminal, information of the terminal and signal information of a neighbor cell.

In the above, the information about the RTT for transmitting and receiving from the terminal to the current serving base station is an RTT, or a distance from the terminal to the current serving base station calculated using the RTT.

In the above, the information of the terminal comprises one or more of the followings: International Mobile Subscriber Identity (IMSI) of the terminal, a unique connection mark of the base station and the terminal at an S1 interface, and a unique connection mark of a mobility management entity and the terminal at the S1 interface.

In the above, the signal information of the neighbor cell comprises: a global identifier of the neighbor cell, reference signal received power of the neighbor cell and/or reference signal received quality of the neighbor cell.

In the above, the locating message also comprises longitude and latitude information of the current serving base station.

In the above, the locating message also comprises path loss information, and the step of locating the terminal by using the locating message comprises: acquiring cross information of the terminal in possible ranges of multiple cells by using the path loss information; and the locating judgment center precisely locating the terminal according to the cross information.

In the above, the locating judgment center is located at a core network element or an operation administration and management system.

The present invention further provides a device for locating a terminal by using a base station, comprising: a constructing unit, configured to construct a locating message by expanding a location report message or via an independent message; a sending unit, configured to send the locating message to a locating judgment center; and a locating unit, configured to locate the terminal by using the locating message.

In virtue of the present invention, a locating message can be obtained according to the base station, and reported to the judgment center, which estimates the location of the terminal based on the reported locating message. The locating of the terminal is helpful to solve problems such as coverage and mobility optimizations; meanwhile it is helpful to reduce the power consumption of the UE by making full use of the information obtained by the base station side to locate.

BRIEF DESCRIPTION OF THE DRAWINGS

The drawings illustrated here provide a further understanding of the present invention and form a part of the present application. The exemplary embodiments and the description thereof are used to explain the present invention without unduly limiting the scope of the present invention, wherein:

FIG. 5 is a structure diagram of the locating message according to an embodiment of the present invention;

DETAILED DESCRIPTION OF EMBODIMENTS

The present invention is further explained by the embodiments in conjunction with the drawings.

Figure 1:
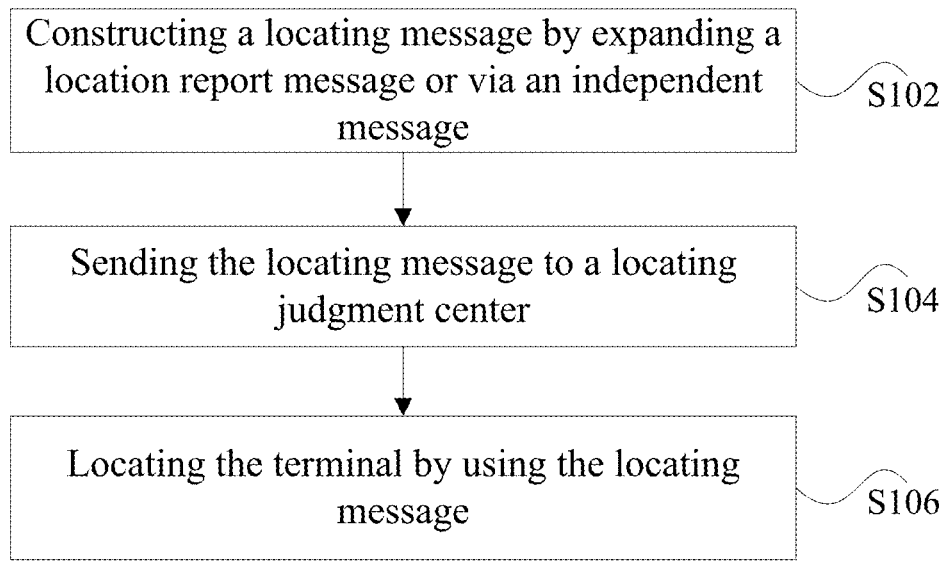
FIG. 1 is a flowchart of the method for locating a terminal by using a base station according to an embodiment of the present invention.

FIG. 1 is a flowchart of a method for locating a terminal by using a base station according to an embodiment of the present invention. The method includes the following steps:

step S102: a locating message is constructed by expanding a location report message or via an independent message;

step S104: the locating message is sent to a locating judgment center; and step S106: the terminal is located by using the locating message.

In the related art, locating process is realized without making full use of base station information, thereby increasing the power consumption of the terminal, and directly influencing the user's satisfaction degree. In the method of the embodiment of present invention, the locating judgment center is informed of the constructed locating message for locating, thus the power consumption of the terminal is reduced, and thereby the user's satisfaction degree is improved.

Preferably, the locating message includes information about the round trip time (RTT) for transmitting and receiving from the terminal and the current serving base station, a global identifier of the current serving cell of the terminal, information of the terminal and signal information of a neighbor cell. The locating can be more precise by providing the above information.

Preferably, the information about the round trip time for transmitting and receiving from the terminal and the current serving base station can be an RTT, or the distance from the terminal to the current serving base station calculated by use of the RTT. In the above, if the information is the RTT, the locating judgment center can calculate the distance from the terminal to current serving base station according to the RTT; and if the information is the distance from the terminal to the current serving base station calculated by use of the RTT, the locating judgment center can directly employ the distance for locating, so as to speed up the judgment and improve the efficiency of locating.

Preferably, the information of the terminal includes one or more of the followings: International Mobile Subscriber Identity (IMSI) of the terminal, a unique connection mark of the base station and the terminal at the S1 interface, and a unique connection mark of a mobility management entity and the terminal at the S1 interface.

Preferably, the signal information of the neighbor cell includes the global identifier of the neighbor cell, reference signal received power of the neighbor cell, and/or reference signal received quality of the neighbor cell.

Preferably, the locating message can further include longitude and latitude information of the current serving base station.

Preferably, the locating message further includes path loss information; and the step of locating the terminal by using the locating message includes: acquiring cross information of the terminal in possible ranges of multiple cells by using the path loss information; and the judgment center locating the terminal according to the cross information.

Presumptively, the locating judgment center can be located at a core network element (MME) or an OAM system.

Figure 2:
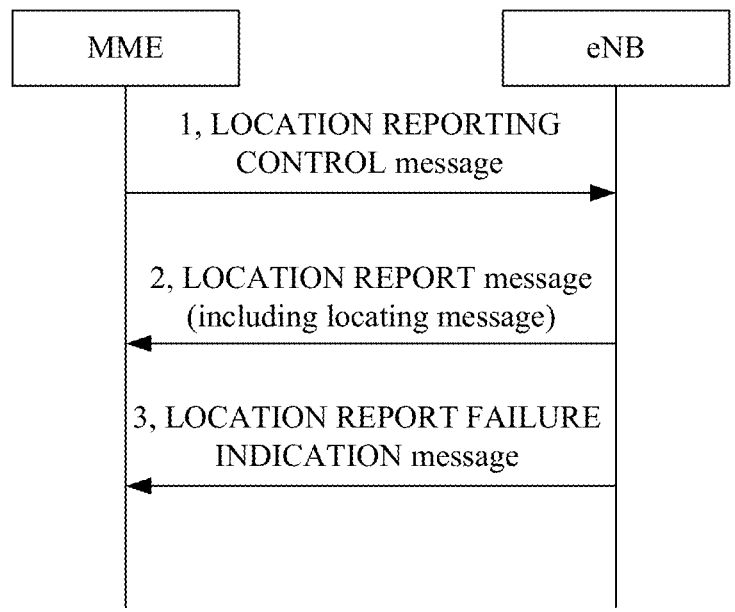
FIG. 2 is a flowchart for locating the terminal according to the first embodiment of the present invention.

The first embodiment is described as follows in conjunction with the FIG. 2.

Step 1: the MME requires the eNB to report the current location of the UE via a LOCATION REPORTING CONTROL message, wherein the message includes request type which includes events and reported contents. The events are currently defined as followings: Direct, Change of service cell, Stop Change of service cell; and the reported contents include the global identifier of the cell.

Step 2: When receiving the control message, if the processing succeeds, the eNB reports to the MME according to the request type via a LOCATION REPORT message, wherein the reported contents include the global identifier of the current serving cell, as an expansion of the embodiment of present invention, the reported contents can further include the RTT for transmitting and receiving from the terminal to the serving cell, or the distance (RTT*3*10^8/2) from the terminal to the serving cell calculated by the base station. Furthermore, the reported contents can also include a locating message of the neighbor cell detected by the terminal, including the global identifier of the neighbor cell and the latest RSRP and/or RSRQ of the neighbor cell detected by the terminal. Furthermore, the base station can also carry its own location information, such as the longitude and latitude information planned by the base station, in the locating message. Otherwise, if the processing fails, then go to step 3.

Step 3: the eNB sends a LOCATION REPORT FAILURE INDICATION message to the MME, wherein the message includes the reasons of failure.

Figure 3:
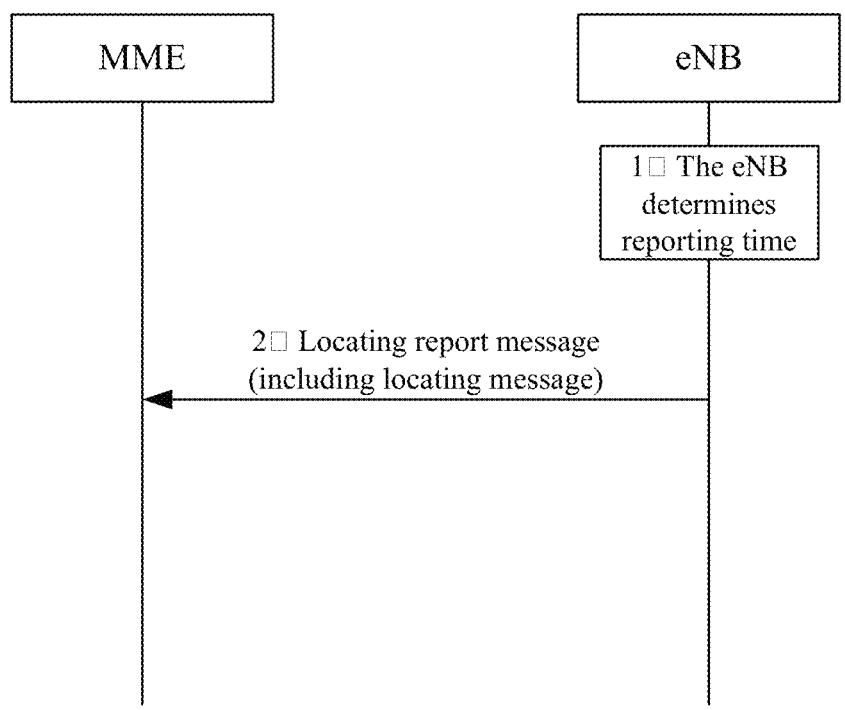
FIG. 3 is a flowchart for locating the terminal according to the second embodiment of the present invention.

The second embodiment is described in conjunction with FIG. 3 as follows.

Step 1: the eNB reports the related locating message of the current terminal to the MME according to requirements, for example, reporting regularly or triggering the report according to the request of the MME.

Step 2: the eNB constructs a locating report message, wherein the message contents include terminal related information (such as IMSI of the terminal, and/or unique connection mark of the base station and the terminal at the S1 interface, and/or unique connection mark of the mobility management entity and the UE at the S1 interface), the global identifier of the current serving cell of the reported terminal, and the message contents can further include the RTT from the terminal to the serving cell, or the distance from the terminal to the serving cell calculated by the base station. Furthermore, the reported contents can also include a locating message of a neighbor cell detected by the terminal, which includes the global identifier of the neighbor cell and the latest RSRP and/or RSRQ of the neighbor cell detected by the terminal. Furthermore, the base station can also carry its own location information, such as the longitude and latitude information planned by the base station, in the locating message, as shown in FIG. 5. In addition, the locating message can also be realized by constructing an independent message.

Figure 4:
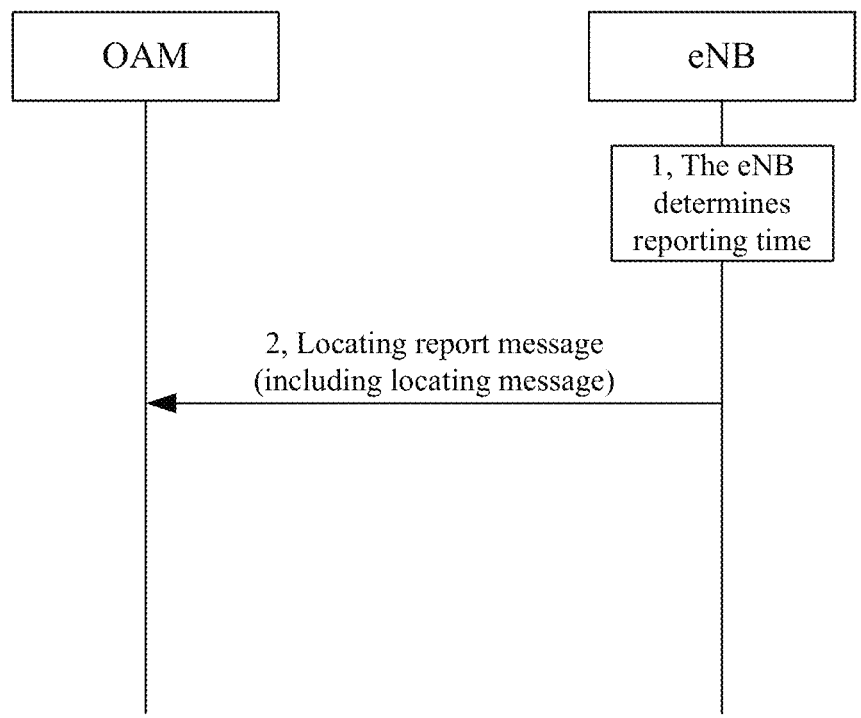
FIG. 4 is a flowchart for locating the terminal according to the third embodiment of the present invention.

The third embodiment is described in conjunction with FIG. 4 as follows.

Step 1: the eNB reports the current terminal related locating message to the OAM according to requirements, for example, reporting regularly or triggering the report according to the request of the OAM.

Step 2: the eNB constructs a locating report message, wherein the message contents include terminal related information (such as IMSI of the terminal, and/or unique connection mark of the base station and the terminal at the S1 interface, and/or unique connection mark of the mobility management entity and the UE at the S1 interface), the global identifier of the current serving cell of the reported terminal; and the message contents can further include the RTT from the terminal to the serving cell, or the distance from the terminal to the serving cell calculated by the base station. Furthermore, the reported contents can also include a locating message of a neighbor cell detected by the terminal which includes the global identifier of the neighbor cell and the latest RSRP and/or RSRQ of the neighbor cell detected by the terminal. Furthermore, the base station can also carry its own location information, such as the longitude and latitude information planned by the base station, in the locating message.

Figure 6:
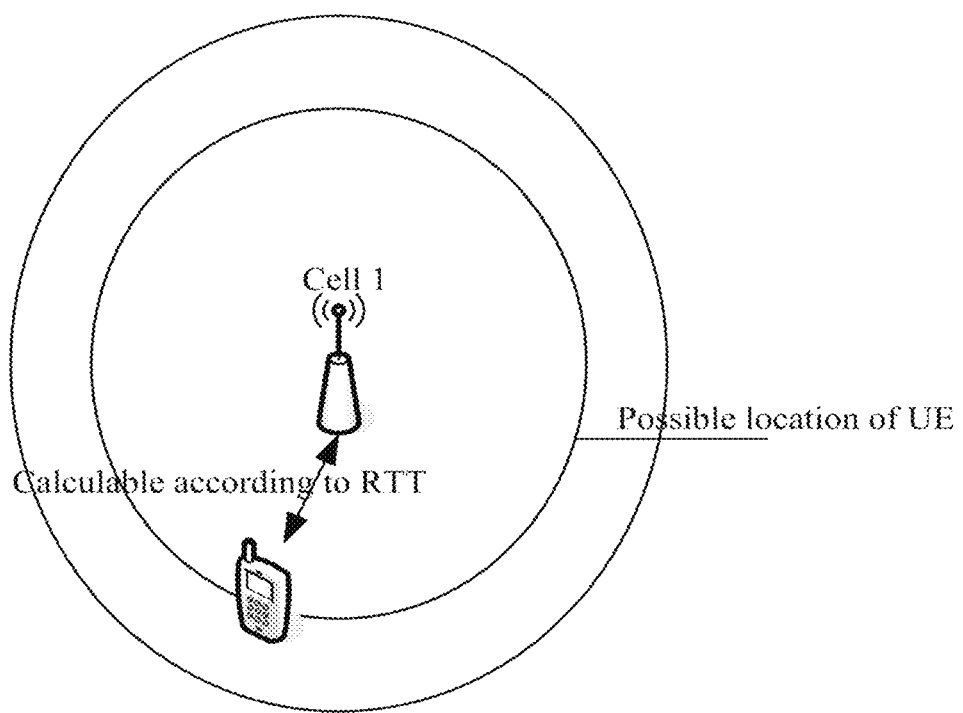
FIG. 6 is a schematic diagram of locating the terminal.
Figure 7:
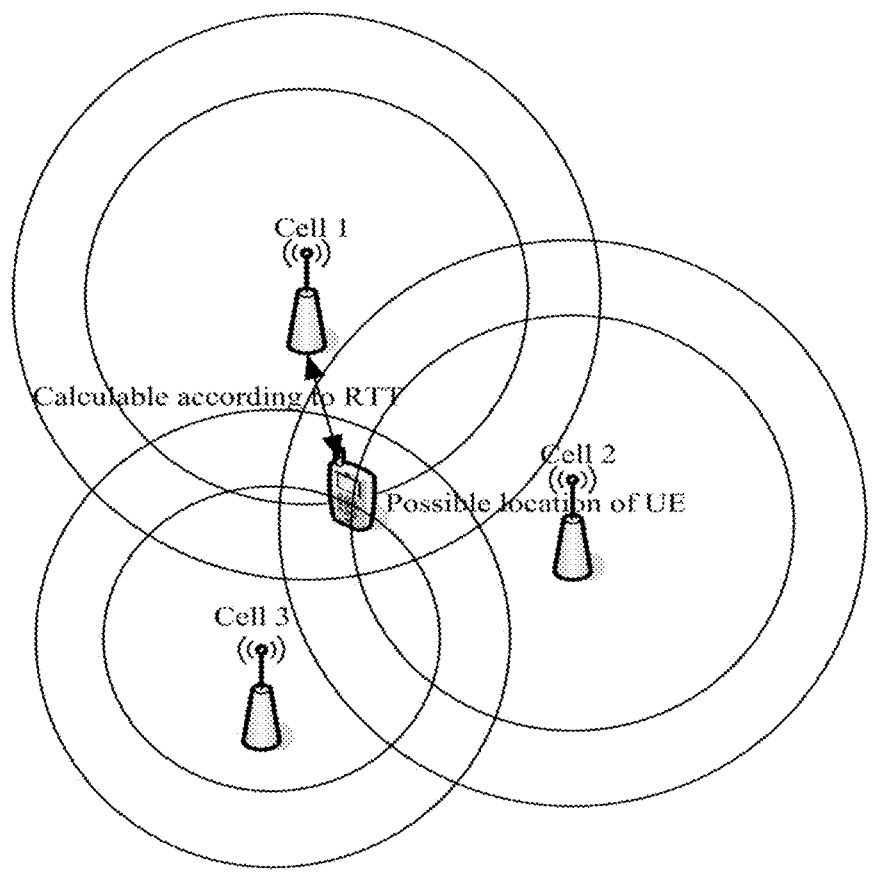
FIG. 7 is a schematic diagram of the terminal location information obtained by the crossing of possible ranges of the terminal at multiple cells.

In the above embodiments, when the locating judgment center receives the information, the terminal can be located through various judgment methods. The locating judgment center can be located at an MME or an OAM. For example, the approximate location of the terminal can be determined via the coverage of the current serving cell and the distance from the terminal to the base station calculated according to the RTT, as shown in FIG. 6, wherein the coverage of an omnidirectional cell and a sector cell are different. Then the current terminal location is further judged according to the signal quality of neighbor cells, such as the reported signal strength of neighbor cells in a sketchy judgment mode, and location distributions of neighbor cells. Usually, the terminal is closer to the base station of the serving cell with a good signal quality. However, the cell signal strength detected by the terminal directly results from the path loss, wherein the signal quality decreases with the increase of the path loss; therefore, more accurately, by a comparison of the path loss and the transmission model of the coverage signal of the neighbor cell, a possible range of the terminal within the neighbor cell can be obtained using the path loss information reported by the terminal or via the calculation result of the base station according to the computing formula: Pathloss=pilot transmission power−RSRP. Then more accurate location information can be obtained by crossing possible ranges of the terminal at multiple cells, as shown in FIG. 7.

Figure 8:
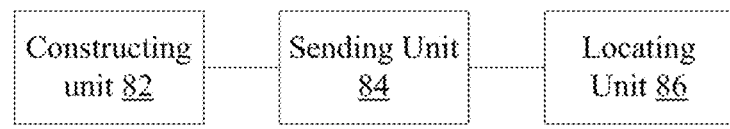
FIG. 8 is a schematic diagram of the device according to an embodiment of the present invention.

FIG. 8 shows a device for locating a terminal by using a base station according to an embodiment of the present invention. The device includes: a constructing unit 82 for constructing a locating message by expanding a location report message or via an independent message; a sending unit 84 for sending the locating message to a locating judgment center; and a locating unit 86 for locating the terminal by using the locating message.

Those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the program code executable for a calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only preferable embodiments of the present invention, which are not used to restrict the present invention. For those skilled in the art, the present invention may have various changes and variations. Any amendments, equivalent substitutions, improvements etc. within the spirit and principle of the present invention are all included in the scope of the claims of the present invention.

The invention claimed is:

1. A method for locating a terminal by using a base station, comprising the steps of:
   constructing a locating message by expanding a location report message or via an independent message;
   sending the locating message to a locating judgment center, wherein the locating judgment center is located at a core network or operation administration and management system; and
   locating the terminal by using the locating message;
   wherein the locating message comprises information about a round trip time (RTT) for transmitting and receiving from the terminal to a current serving base station, longitude and latitude information of the current serving base station, a global identifier of a current serving cell of the terminal, information of the terminal and signal information of a neighbor cell;

wherein the signal information of the neighbor cell comprises: a global identifier of the neighbor cell, reference signal received power of the neighbor cell and/or reference signal received quality of the neighbor cell.

2. The method according to claim 1, wherein the information about the RTT for transmitting and receiving from the terminal to the current serving base station is an RTT, or a distance from the terminal to the current serving base station calculated using the RTT.

3. The method according to claim 1, wherein the information of the terminal comprises one or more of the followings: International Mobile Subscriber Identity (IMSI) of the terminal, a unique connection mark of the base station and the terminal at an S1 interface, and a unique connection mark of a mobility management entity and the terminal at the S1 interface.

4. The method according to claim 1, wherein the locating message also comprises path loss information, and the step of locating the terminal by using the locating message comprises:

acquiring cross information of the terminal in possible ranges of multiple cells by using the path loss information; and the locating judgment center locating the terminal according to the cross information.

5. A device for locating a terminal by using a base station, comprising:

a constructing unit, configured to construct a locating message by expanding a location report message or via an independent message;

a sending unit, configured to send the locating message to a locating judgment center, wherein the locating judgment center is located at a core network or operation administration and management system; and a locating unit, configured to locate the terminal by using the locating message;

wherein the locating message comprises information about a round trip time (RTT) for transmitting and receiving from the terminal to a current serving base station, longitude and latitude information of the current serving base station, a global identifier of a current serving cell of the terminal, information of the terminal and signal information of a neighbor cell;

the signal information of the neighbor cell comprises: a global identifier of the neighbor cell, reference signal received power of the neighbor cell and/or reference signal received quality of the neighbor cell.

* * * * *